US012030535B2

(12) United States Patent
Eckelmann-Wendt et al.

(10) Patent No.: US 12,030,535 B2
(45) Date of Patent: Jul. 9, 2024

(54) RAILWAY AUTOMATION NETWORK AND METHOD FOR TRANSMITTING MESSAGES IN A RAILWAY AUTOMATION NETWORK

(71) Applicant: SIEMENS MOBILITY GMBH, Munich (DE)

(72) Inventors: Uwe Eckelmann-Wendt, Wolfenbuettel (DE); Stefan Gerken, Braunschweig (DE); Hans-Peter Huth, Munich (DE); Johannes Riedl, Ergolding (DE); Andreas Schallenberg, Peine (DE)

(73) Assignee: Siemens Mobility GmbH, Munich (DE)

( * ) Notice: Subject to any disclaimer, the term of this patent is extended or adjusted under 35 U.S.C. 154(b) by 490 days.

(21) Appl. No.: 16/756,549

(22) PCT Filed: Sep. 17, 2018

(86) PCT No.: PCT/EP2018/075078
§ 371 (c)(1),
(2) Date: Apr. 16, 2020

(87) PCT Pub. No.: WO2019/076559
PCT Pub. Date: Apr. 25, 2019

(65) Prior Publication Data
US 2020/0290657 A1 Sep. 17, 2020

(30) Foreign Application Priority Data
Oct. 16, 2017 (DE) .......................... 102017218460.4

(51) Int. Cl.
*B61L 27/00* (2022.01)
*B61L 15/00* (2006.01)
(Continued)

(52) U.S. Cl.
CPC ....... *B61L 15/0027* (2013.01); *B61L 15/0072* (2013.01); *H04W 4/06* (2013.01)

(58) Field of Classification Search
None
See application file for complete search history.

(56) References Cited

U.S. PATENT DOCUMENTS 9,673,995 B2\* 6/2017 Angst ...................... H04L 1/22
2006/0116117 A1 6/2006 Takase et al.
(Continued)

FOREIGN PATENT DOCUMENTS

| CN | 102891797 A | 1/2013 |
| CN | 104378291 A | 2/2015 |

(Continued)

OTHER PUBLICATIONS

Chand, Raphael et al: "XNET: A Reliable Content-Based Publish/Subscribe System", In: Reliable Distributed Systems 2004, Proceedings of the 23rd IEEE International Symposium on Reliable Distributed Systems (SRDS'04), pp. 264-273.
(Continued)

*Primary Examiner* — Adam D Tissot
*Assistant Examiner* — Michael T Silva
(74) *Attorney, Agent, or Firm* — Laurence A. Greenberg; Werner H. Stemer; Ralph E. Locher

(57) ABSTRACT

A railway automation network includes a publish/subscribe system with at least one transmitter-end application, at least one transmitter-end message broker, at least one receiver-end message broker and at least one receiver-end application. The at least one transmitter-end message broker is configured to map a message published by the transmitter-end application or one of the transmitter-end applications onto at least two redundant, at least partially physically independent network paths of the railway automation net-
(Continued)

work on the basis of a subject specified in the message. The railway automation network is configured to transmit the message to the receiver-end message broker or at least one of the receiver-end message brokers simultaneously over the at least two network paths. The receiver-end message broker is configured to transmit the message to the at least one receiver-end application. A method for transmitting messages in a railway automation network is also provided.

14 Claims, 5 Drawing Sheets

(51) Int. Cl.
*G05D 1/00* (2024.01)
*H04L 12/46* (2006.01)
*H04W 4/06* (2009.01)

(56) References Cited

U.S. PATENT DOCUMENTS

| | | | |
|---|---|---|---|
| 2011/0249628 A1* | 10/2011 | Peltz | B61L 3/127 370/328 |
| 2011/0286451 A1* | 11/2011 | Rabinovitz | H04L 45/24 370/390 |
| 2012/0117172 A1* | 5/2012 | Hickson | H04L 67/563 709/206 |
| 2013/0322232 A1* | 12/2013 | Csaszar | H04L 12/18 370/217 |
| 2014/0280627 A1* | 9/2014 | Ross | H04L 51/214 709/206 |
| 2015/0049639 A1* | 2/2015 | Angst | H04L 12/4641 370/254 |
| 2015/0281335 A1* | 10/2015 | Heine | H04L 12/42 709/204 |
| 2016/0016596 A1* | 1/2016 | Naylor | H04L 67/12 709/220 |
| 2017/0001653 A1* | 1/2017 | Ferencz, Jr. | G16Y 10/40 |
| 2017/0264560 A1* | 9/2017 | Heine | H04L 12/40182 |
| 2018/0167476 A1* | 6/2018 | Hoffner | H04L 67/55 |

FOREIGN PATENT DOCUMENTS

| | | |
|---|---|---|
| CN | 104618236 A | 5/2015 |
| DE | 102012212304 A1 | 1/2014 |
| WO | 2014165024 A1 | 10/2014 |
| WO | 2017004229 A1 | 1/2017 |

OTHER PUBLICATIONS

Wikipedia: "Multicast"; Sep. 17, 2017, URL: https://en.wikipedia.org/w/index.php?title=Multicast&oldid=801131466 [retrieved Jun. 19, 2018].

* cited by examiner

RAILWAY AUTOMATION NETWORK AND METHOD FOR TRANSMITTING MESSAGES IN A RAILWAY AUTOMATION NETWORK

BACKGROUND OF THE INVENTION

Field of the Invention

Railway automation networks, i.e. communication networks or control systems used in the field of railway automation, as part of their operation, must meet high demands for correct and reliable transmission of messages, in the form of control information for example. The reason for this is that the corresponding transmission characteristics have or can have direct effects on the safety of signaling systems. Corresponding railway automation networks or railway automation systems usually consist of at least one control unit that controls a plurality of terminals or requests information from said units and requires a corresponding communication network in order to do this. A particular aspect of railway automation networks here is that they usually comprise a large number of devices or units and are frequently geographically dispersed, so that a distributed system with components at different locations is produced.

The disadvantage of known railway automation networks is frequently their lower flexibility and scalability. This means that changes or expansions of the railway automation network, through the introduction of new components for example, are only possible as a rule to a very restricted extent or are associated with significant effort and costs.

SUMMARY OF THE INVENTION

The object underlying the present invention is to specify a railway automation network that is able to be employed especially flexibly and allows a great degree of scalability.

This object is achieved in accordance with the invention by a railway automation network, wherein the railway automation network has a publish/subscribe system with at least one transmitter-end application configured to publish messages, at least one transmitter-end message broker, at least one receiver-end message broker and at least one receiver-end application configured to receive messages, wherein each transmitter-end application is linked for communication purposes to the transmitter-end message broker, wherein the at least one transmitter-end message broker is configured to map a message published by the transmitter-end application or by one of the transmitter-end applications on the basis of a subject specified in the message onto at least two redundant network paths of the railway automation network at least partly physically independent of one another, wherein the railway automation network is configured to transfer the message simultaneously via the at least two network paths to the receiver-end message broker or to at least one of the receiver-end message brokers, wherein each receiver-end application is linked for communication purposes to the receiver-end message broker or to one of the receiver-end message brokers and wherein the receiver-end message broker is configured to transfer the message to the at least one receiver-end application.

The inventive railway automation network is thus initially characterized by having a publish/subscribe system. In this case the publish/subscribe system comprises at least one transmitter-end device configured to publish messages, at least one transmitter-end message broker, at least one receiver-end message broker and also at least one receiver-end application configured to receive messages.

Corresponding publish/subscribe systems are known as such from other areas of application and generally make it possible to decouple an information provider from a recipient of information. In such cases transmitter-end applications are frequently also referred to as publishers and receiver-end applications as subscribers.

In relation to the inventive railway automation network the result of the realization or use of a publish/subscribe system is that transmitter-end and receiver-end applications do not have to know one another. In particular this leads, in the event of a further receiver-end application wishing to receive messages or data from the transmitter-end application, to the transmitter-end application not having to be modified in order to transmit these messages additionally to the further receiver-end application. A message is not directly addressed or sent by a transmitter-end application to specific receiver-end applications, but is categorized into a class by means of a subject, which can also be referred to as a topic or theme, without any knowledge about whether there are receiver-end applications registered for this subject or not. Based on the subject and/or further (address) information contained in the messages, such as for example an identifier identifying the transmitter-end application or a message type as selection criterion, receiver-end applications can register their interest in messages. A receiver-end application can thus receive messages without having any knowledge about whether there are any corresponding transmitter-end applications at all and, if there are, which ones they are. The corresponding decoupling between the transmitter-end applications and the receiver-end applications is done here by means of the appropriate message broker, i.e. by the at least one transmitter-end and also the at least one receiver-end message broker, which can also be referred to as a switching device, message distributor or broker devices.

It should be noted at this point that a transmitter-end application will frequently also be a receiver-end application, i.e. will occur on the one hand as a publisher of messages or information and on the other hand as a subscriber. A respective message broker can likewise serve as a transmitter-end and also as a receiver-end message broker, in which case both transmitter-end applications and also receiver-end applications are linked to the respective message broker for communication purposes.

It should furthermore be noted that said components of the publish/subscribe system involve a functional architecture, which can be realized in different ways in terms of hardware and software. Thus for example it is conceivable on the one hand for each of the components to be realized by means of its own, separate hardware device, in the form of a corresponding computer for example. On the other hand however there is the option of at least some of said components jointly using a corresponding hardware device. This can apply to one or more transmitter-end applications or to the receiver-end message broker or message brokers for example and also in a corresponding way to the receiver-end message broker or message brokers and to the at least one receiver-end application.

In the inventive railway automation network the transmitter-end application is linked for communication purposes to the transmitter-end message broker or to one of the transmitter-end message brokers. This means that precisely one transmitter-end message broker is assigned to the transmitter-end application or the transmitter-end applications in each case. Thus the transfer of messages for the respective transmitter-end application takes place using this relevant transmitter-end message broker as an intermediary. In this case the linkage of the respective transmitter-end application to the respective transmitter-end message broker is not necessarily static or permanent, but can for example also be exclusively done on-demand, such as in preparation for the transfer of a message. The same applies analogously in relation to the respective receiver-end application and also the respective receiver-end message broker.

In accordance with the invention the at least one transmitter-end message broker is configured to map a message published by the transmitter-end application or by one of the transmitter-end applications on the basis of a subject specified in the message onto at least two redundant network paths of the railway automation network that are at least partly physically independent of one another. The formulation "redundant network paths at least partly physically independent of one another" is to be understood in this case as the at least two network paths using a different network infrastructure on at least part of a stretch of the respective network path, so that a failure or a fault in the network infrastructure concerned of the one network path does not have any effects on the network infrastructure concerned of the other network path. In the sense of the greatest possible independence of the at least two network paths, said paths are preferably physically independent of one another at least as far as possible or even completely. In this case the network paths can exist within a contiguous communication network but also be formed by means of a number of materially or physically separate "redundant" communication networks.

The inventive railway automation network is furthermore configured to transfer the message simultaneously to the receiver-end message broker or to at least one of the receiver-end message brokers over the at least two network paths. In this case "simultaneously" is to be understood in such a way that the message (or a copy of the same) will be transferred over each of the network paths to the receiver-end message broker or to at least one of the receiver-end message brokers. This means that the message as such is transferred redundantly. In concrete terms this can be done for example in such a way that messages to be transmitted on the part of the respective transmitter-end application and/or on the part of the transmitter-end message broker will be provided with an additional unique sequence number and transmitted or transferred as copies over the at least two network paths. Preferably the sequence number here is unique as regards the respective subject and as regards the respective transmitter-end application. Since the actual content is not changed by this, a copy of the message or (copy of) the message supplemented by the corresponding sequence number or by similar control information will be referred to as the "message" within the framework of the present invention.

In accordance with the invention each receiver-end application is furthermore linked for communication purposes to the receiver-end message broker or to one of the receiver-end message brokers and the receiver-end message broker is configured to transfer the message to the at least one receiver-end application. This means that the message is transferred to the at least one receiver-end application on the part of the receiver-end message broker. In this case the at least one receiver-end application involves such an application as has previously registered with the receiver-end message broker for receiving messages relating to the subject concerned.

The inventive railway automation network is characterized in that, by using a publish/subscribe system, it undertakes a decoupling of transmitter-end and also receiver-end applications, whereby the applications do not need any knowledge about possible communication partners. Through this a greater flexibility is achieved advantageously to the extent that even during ongoing operation of the railway automation network, new transmitter-end or receiver-end applications can be started or added or existing applications can also be shifted between platforms or computers. This is advantageously possible without any reconfiguration of the entire railway automation network accompanied by a corresponding distribution of information to applications involved being required. This makes it possible for example to bundle transmitter-end and/or receiver-end applications in a few larger computer centers in order to reduce operating costs. In this case the applications can furthermore also be distributed over different computer platforms or computer centers, in order to enhance fault tolerance. At the same time for example supplementary applications, which carry out monitoring of the railway automation network for example and allow additional fault diagnosis or even predictive management to avoid errors, can be added flexibly to the railway automation network. By comparison with known railway automation networks that are comparatively rigid in their configuration, the inventive railway automation network here is also especially advantageous to the extent that it is highly scalable, so that expansions are possible without fundamental changes to the network architecture.

The inventive railway automation network offers the further advantage of making it possible to transfer messages over a number of network paths at least partly physically independent of one another. Through a corresponding simultaneous, i.e. essentially multiple transfer of the message or of a copy of said message at the same time over the number of network paths, a marked increase in robustness and reliability of the railway automation network, in particular in relation to possible outages of parts of the network, is achieved. It should be noted here that the inventive railway automation network realizes a simultaneous transmission of the messages over the at least two network paths regardless of whether an outage is actually present or not. The fact that the available network redundancy in relation to the two or more transmission paths is used in general and not only in the event of an error, i.e. when a transfer of a message has failed as a result of an outage of parts of the communication network used for example, means that a reliable and largely delay-free transmission of messages is guaranteed here in line with the requirements of railway automation.

It should be pointed out that the inventive railway automation network will as a rule (exclusively) comprise infrastructure-side applications or components. This means that the respective applications can especially involve those that relate to components arranged at the side of the track, such as in the form of signals, balises, wheel sensors or switches. In such cases in particular local control devices of said components as transmitter-end and/or receiver-end applications can communicate with appropriate interlock-side control or monitoring units. Moreover however the possibility basically also exists of the inventive railway automation network additionally also comprising vehicle-side components, i.e. transmitter-end and/or receiver-end applications or if necessary consisting exclusively of said components. Corresponding applications can for example involve a vehicle-side control device of a train-influencing system as well as sensors connected for the purposes of communication to said system.

In accordance with an especially preferred embodiment of the inventive railway automation network this is configured to transfer the message simultaneously to a number of receiver-end message brokers, which are each assigned to at least two multicast groups, wherein each of the multicast groups uses one of the redundant, at least partly physically independent network paths of the railway automation network. The use of the multicast method is advantageous since through this transmitter-end applications can send messages to a number of receiver-end applications, wherein the respective transmitter-end application only sends its message once however. The communication network, which must support multicast for this, as is the case for example with Standard Ethernet (IEEE 802.3) as well as in IP networks with support for the Protocol Independent Multicast Sparse Mode (PIM-SM), then distributes this message autonomously to all interested receiver-end applications, which are assigned to the respective multicast group. In conjunction with the inventive railway automation network there can advantageously be a mapping here for each subject to at least two multicast groups, wherein the respective multicast group is each assigned a multicast address.

Through the use of multicast it is thus advantageously made possible in an especially simple and efficient manner to transfer a message at the same time or simultaneously to a number of receiver-end message brokers. In this case, within the framework of the transfer by means of multicast, a simultaneous transfer of the message over redundant at least partly physically independent network paths of the railway automation network is also realized or guaranteed.

At least in the event of the message being transferred without error over each of the network paths to the respective receiver-end message broker, said broker receives the respective message (or at least copies of the message identical in content) multiple times. Basically in this situation the possibility now exists of the respective receiver-end message broker also transferring or forwarding each of the messages received to the respective receiver-end application, in which case the latter must guarantee correct handling of multiple received messages with identical contents.

In accordance with a further especially preferred form of embodiment the inventive railway automation network is designed in such a way that the at least one receiver-end message broker is configured, as a result of the redundant transfer of the message, to discard duplicates of the message received. This is advantageous since in this way each message is only received once by the respective receiver-end application. This is realized by duplicates of the message received as a result of the redundant transfer of the message, i.e. copies of the message identical to a message already received, being discarded by the respective receiver-end message broker. In concrete terms this can be realized for example by messages to be transmitted by the respective transmitter-end message broker being provided with an additional unique sequence number and, as described, by the message being transferred simultaneously over the redundant network paths. If messages or message copies are now received by the receiver-end message broker over the different message paths, which should be the case as a rule, then of these messages or message copies that have the same sequence number and the same content, the receiver-end message broker exclusively forwards the first received message to the respective receiver-end application. This means that the redundant message transfer is created by the message brokers by the respective transmitter-end message broker creating redundancy on the input side, which is then removed again by the respective receiver-end message broker on the output side. Consequently the network redundancy created or used by the message brokers is not visible for the applications, i.e. both for the at least one transmitter-end application and also for the at least one receiver-end application. Thus a decoupling from the applications is also achieved in this regard by means of the message brokers during the transfer of the messages in the respective communication network.

In accordance with a further especially preferred development of the inventive railway automation network the message brokers are connected for communication purposes by means of pre-configured multicast groups for the purposes of exchange of administration data. This applies both to the at least one transmitter-end message broker and also to the at least one receiver-end message broker. Administration data here refers to such data as is exchanged between message brokers detached from actual messages to be transferred between applications. Corresponding administration data, which can also be referred to as signaling data, can in particular involve data or information about publish/subscribe relationships. This means that the message brokers can exchange information with each other by means of the pre-configured multicast groups about newly-registered receiver-end applications or newly-added transmitter-end applications and the respective topics. Preferably here the preconfigured multicast groups in their turn are assigned to a number of redundant, at least partly physically independent network paths of the railway automation network, such that also in relation to the corresponding communication connections, which can also be referred to as a discovery channel, between the message brokers, a network redundancy and thus an especially high reliability and robustness can be achieved.

Preferably the inventive railway automation network can also be developed in such a way that that the railway automation network is configured to use a connectionless protocol, in particular the User Datagram Protocol UDP, as the transport protocol for transferring the message. This is advantageous since for example with UDP, unlike with TCP, when a message or a telegram is lost, there is no repeat of the transmission and delays resulting from a backlog of messages are avoided by this. In this case it should be taken into account that, within the framework of railway automation, because of the existing real-time requirements, out-of-date messages are seen by an application as to be equated to a loss of the message concerned. Furthermore UDP as a transport protocol offers for example the advantage of supporting a transfer of messages by means of multicast. The use of a connectionless protocol such as UDP as the transport protocol for transfer of messages in the area of railway automation as well makes it possible for or supports the inventive railway automation network, by the simultaneous transfer of the messages via the at least two network paths, since a greater transmission reliability is achieved than UDP provides by itself.

In accordance with an especially preferred form of embodiment of the inventive railway automation network the transmitter-end application is configured to publish a message that comprises selection criteria in the form of the subject and a code identifying the transmitter-end application, each in the form of a unique identity within the railway automation network. The use of corresponding one-to-one identities, which can for example involve Universally Unique Identifiers (UUID) or also Globally Unique Identifiers (GUID), offers the advantage that in the distributed railway automation network, even without central coordination a unique identification both of the subject and also of the code identifying the transmitter-end application is made possible. A corresponding (one-to-one) unique identity is the requirement or foundation for an error-free and reliable communication by means of the railway automation network being possible.

The inventive railway automation network can furthermore also be embodied in such a way that the transmitter-end application is configured to publish a message that comprises a domain identification, through which a plurality of transmitter-end applications are identified as belonging together. In this case the domain identification involves information which is common to transmitter-end applications that belong together. For example this can involve location information, i.e. a specification such as South Bavaria for example, or a specification about the respective organization (e.g. Bayerische Oberlandbahn). The encoding of the corresponding information, i.e. the domain identification, can be done by a separate address field or through a corresponding structuring of the address of the transmitter-end applications. In such cases the domains can be encoded in binary form or as text. Advantageously search patterns can be applied to the domain identification on the part of the receiver-end applications when subscribing to messages.

In accordance with a further especially preferred embodiment of the inventive railway automation network the transmitter-end message broker is configured to transfer the message over each of the at least partly physically independent network paths multiply offset in time to the receiver-end message broker or to at least one of the receiver-end message brokers. In this case, as well as the network redundancy through the transmission over the number of network paths, a line redundancy is additionally realized to the extent that the respective message is transferred over each of the at least partly physically independent network paths multiply offset in time. In such cases the respective time offset will be comparatively small as a rule, i.e. will be in the order of magnitude of milliseconds for example. This is based on the knowledge that the probability of loss with faulty lines or faulty network paths, i.e. in particular with sporadic faults occurring over the short term, can be reduced by a corresponding multiply time-offset transmission of messages. In this case there can be a corresponding additional, multiply time-offset transfer with a configurable delay and number of repetitions. In this case too all messages sent can preferably be provided with an additional unique sequence number and sent or transmitted as corresponding copies. On receipt of messages or message copies with the same sequence number and the same content the respective receiver-end message broker for its part preferably forwards the first message or message copy received to the respective receiver-end application. This advantageously means that for the receiver-end applications the multiply time-offset transmission of the messages is not visible and thus that this also does not need to be considered on the part of the receiver-end applications. The preferred form of embodiment of the inventive railway automation network described above is especially advantageous when a connectionless protocol is used, such as UDP for example, since loss of messages is allowed with corresponding protocols. On the other hand a message in a connection-based protocol such as TCP for example is repeated by the protocol itself in the event of it being lost. However the inherent disadvantage of this is that delays or congestion can occur.

Preferably the inventive railway automation network can also be designed in such a way that at least one of the applications is available redundantly. As already explained, the inventive railway automation network offers significant advantages in relation to flexibility and scalability. In the sense of a load distribution and/or enhanced fault tolerance there is especially the option or the advantage here of applications, i.e. transmitter-end and/or receiver-end applications, being able to participate multiple times redundantly at any given locations on the railway automation network or railway automation system without additional effort, without a switchover in communication being required for this.

The invention furthermore relates to a method for transfer of messages in a railway automation network.

In respect of the method, the underlying object of the present invention lies in specifying a method for transfer of messages in a railway automation network that can be used especially flexibly and at the same time allows a high degree of scalability.

This object is achieved in accordance with the invention by a method for transfer of messages in a railway automation network, wherein a publish/subscribe system is set up in the railway automation network with at least one transmitter-end application configured for publishing messages, with at least one transmitter-end message broker, wherein each transmitter-end application is linked for communication purposes to the transmitter-end message broker or to one of the transmitter-end message brokers, with at least one receiver-end application configured to receive messages and also with at least one receiver-end message broker, wherein each receiver-end application is linked for communication purposes to the receiver-end message broker or to one of the receiver-end message brokers, wherein a message published by the transmitter-end application or by one of the transmitter-end applications is mapped by the relevant receiver-end message broker, using a subject specified in the message, onto at least two redundant network paths of the railway automation network, at least partly physically independent of one another, wherein the message is transferred simultaneously to the receiver-end message broker or to at least one of the receiver-end message brokers over the at least two network paths, and wherein the message is transferred by the at least one receiver-end message broker to the at least one receiver-end application.

The advantages of the inventive method correspond to those of the inventive railway automation network, so that in this regard the reader is referred to the corresponding information given above. The same applies in respect of the developments of the inventive method given below in relation to the respective corresponding preferred development of the inventive railway automation network, so that in this respect the reader is referred to the corresponding explanations given above.

Preferably the inventive method can be developed in such a way that the message is transferred simultaneously to a number of receiver-end message brokers, which are each assigned to at least two multicast groups, wherein one of the redundant, at least partly physically independent network paths of the railway automation network is used for each of the multicast groups.

In accordance with a further especially preferred form of embodiment of the inventive method duplicates of messages received because of the redundant transfer of the message are discarded by the receiver-end message broker or by the at least one of the receiver-end message brokers.

Preferably the inventive method can also be designed in such a way that administration data is exchanged between themselves by the message brokers by means of preconfigured multicast groups.

In accordance with an especially preferred development of the inventive method a connectionless protocol, in particular the User Datagram Protocol UDP, is used as the transport protocol for transferring the message.

Preferably the inventive method can also be further developed to the extent that a message is published by the transmitter-end application that comprises selection criteria in the form of the subject and a code identifying the transmitter-end application, each in the form of a unique identity within the railway automation network.

In accordance with a further especially preferred development of the inventive method a message is published by the transmitter-end application that comprises a domain identification, through which a plurality of transmitter-end applications are identified as belonging together.

Preferably the inventive method can also be designed in such a way that the message is transferred from the transmitter-end message broker over each of the at least partly physically independent network paths multiply offset in time to the receiver-end message broker or to at least one of the receiver-end message brokers.

The invention will be explained in greater detail below with reference to exemplary embodiments.

DETAILED DESCRIPTION OF THE INVENTION

Figure 1:
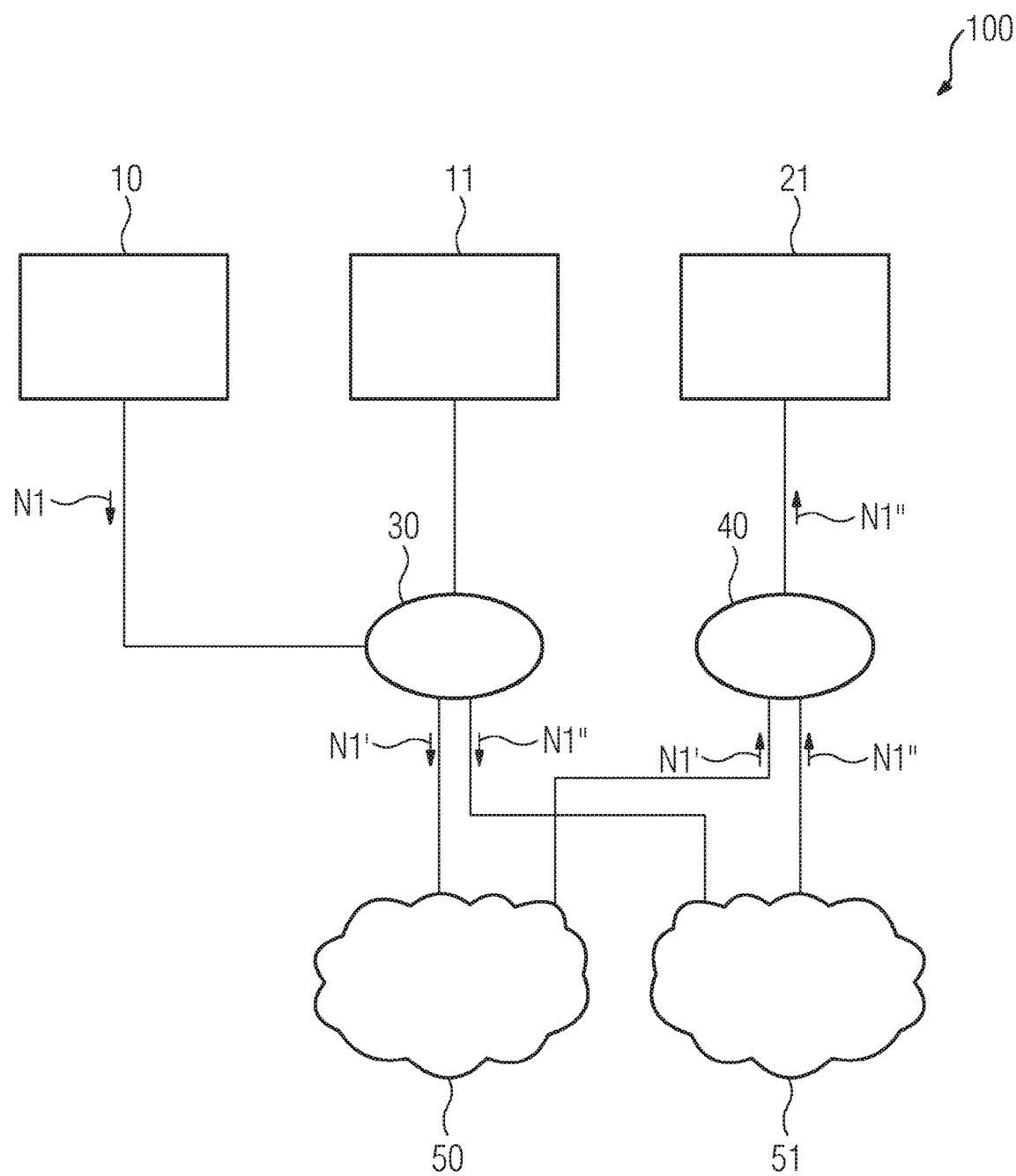
FIG. 1 shows a schematic diagram of a first exemplary embodiment of the inventive railway automation network.

In the figures, for reasons of clarity, the same reference characters are used for the same components or for components that act in the same way.

FIG. 1 shows a schematic diagram of a first exemplary embodiment of the inventive railway automation network. In detail a railway automation network 100 is shown here that comprises applications 10, 11 and 21. In this case the applications 10, 11, 21 are an element of a publish/subscribe system of the railway automation network 100. It should be assumed here that the applications 10 and 11 involve transmitter-end applications, i.e. publishers, and application 21 involves a receiver-end application, i.e. a subscriber of the publish/subscribe system. To avoid misunderstandings it should be pointed out that in practice an application can frequently be publisher and subscriber at the same time, i.e. will be a transmitter-end and a receiver-end application at the same time. The distinction made between the transmitter-end applications 10, 11 and the receiver-end application 21 thus serves, within the framework of the description of the exemplary embodiments primarily to explain the manner of the transmission of messages in the railway automation network 100.

Also indicated in the schematic diagram of FIG. 1 are a transmitter-end message broker 30 and also a receiver-end message broker 40, which are preferably each realized as software components. As indicated by corresponding connecting lines, the transmitter-end applications 10, 11 are linked here for the purposes of communication to the transmitter-end message broker 30 and the receiver-end application 21 is linked to the receiver-end message broker 40. The corresponding communication link can be made here in any manner known per se, i.e. in particular as a wired link and also wirelessly. It should also be noted at this point with respect to the message brokers 30, 40 that in practice both transmitter-end applications and receiver-end applications can be linked to said message brokers, so that the message brokers 30, 40 in this case function both as transmitter-end and also as receiver-end message brokers.

The messages transferred by the transmitter-end applications 10, 11 to the transmitter-end message broker 30 can be divided roughly into two types. On the one hand they can involve signaling messages of the transmitter-end applications 10, 11, for example in the form of a wish to subscribe to something. On the other hand they can involve application messages, which will be delivered to other applications, in the present case to the receiver-end application 21.

Within the framework of the exemplary embodiment described it should be assumed that the transmitter-end application 10 publishes a message N1 in the form of an application message. This means that, in accordance with the usual method of operation in publish/subscribe systems, the message N1 is not sent by the transmitter-end application 10 to a specific addressee, but is published provided with address information. In this case the address information consists of a specification about the sender of the message N1, i.e. a code identifying the transmitter-end application 10, and also a subject about which the message N1 is being published. In this case a corresponding subject can also be referred to as a topic or as a theme. Moreover the address information can optionally comprise information about characteristics of the message N1. Corresponding characteristics can for example describe the importance (priority) or safety characteristics of the message N1. Preferably the message N1 published by the transmitter-end application 10 comprises both the subject and also the code identifying the transmitter-end application 10, each in the form of a one-to-one identity within the railway automation network.

Within the framework of the exemplary embodiment described it should be assumed that the message N1 relates to status data, i.e. status information, of a wheel sensor or a switch drive for example, and the receiver-end application 21 wishes to receive messages on this subject (for example to evaluate said messages on the interlock side in relation to the status of the respective field element). To this end the receiver-end application 21 subscribes to all messages on the subject of status data.

As depicted in the diagram shown in FIG. 1, the transmitter-end application 10 and the receiver-end application 21 do not communicate directly with one another, but are each linked via an interface to the transmitter-end message broker 30 or the receiver-end message broker 40. To avoid misunderstandings it should be pointed out that the schematic diagram depicted in FIG. 1 involves a simplified schematic diagram of a simple exemplary embodiment. This means in particular that the railway automation network 100 will generally have a larger number of both transmitter-end and receiver-end applications. The same applies in relation to the number of transmitter-end and receiver-end message brokers. In this case both the applications and also the message brokers can be geographically distributed. For each subject there can be any given number of transmitter-end applications and any given number of subscribers, i.e. receiver-end applications.

The transmitter-end application 10 can now send the message N1 at any given point in time to the transmitter-end message broker 30. The transmitter-end message broker 30 interprets the message N1 that it has received to the extent that it maps the message N1 published by the transmitter-end application 10 on the basis of the subject specified in the message N1 onto at least two redundant, at least partly physically independent network paths 50, 51 of the railway automation network 100. The corresponding redundant network paths 50, 51, which are preferably largely or completely physically independent of one another, are indicated by corresponding clouds in FIG. 1. This is intended to express the fact that the actual manifestation of the redundant network paths 50, 51 as such is of no significance for the further description.

The railway automation network 100 is now furthermore configured to transfer the message N1 simultaneously over the at least two network paths 50, 51 to the receiver-end message broker 40. This means that that the message N1 is transferred from the transmitter-end message broker 30 to the receiver-end message broker 40 over both the network path 50 and the network path 51. The corresponding messages or message copies are shown in FIG. 1 by the reference characters N1' or N1" in order to differentiate them. In this case the transmitter-end message broker 30 provides the message N1 or the sent messages N1' and N1" with an additional unique sequence number, which is transferred with the message copies N1' and N1" over the network paths 50, 51 which can include different networks or subnetworks, to the message broker 40. Said broker only forwards to the receiver-end application 21 the first message received of the received messages N1' and N1" with the same sequence number and the same content. Within the framework of the described exemplary embodiment this should involve the message N1" here.

In accordance with the explanations given above, a network-side redundancy is achieved on the part of or by means of the message brokers 30 and 40 and also the independent network paths 50, 51. In this case it is important for the message N1 in the form of message copies N1' and N1" to be transferred or transmitted simultaneously, i.e. at the same time, over the network paths 50 and 51. Through this, even in the event of possible faults or outages, a reliable transmission of the message N1 without a time delay is made possible. In particular the necessity of a later repetition of the transfer of the message because of a loss of the same is avoided thereby. The use of a publish/subscribe furthermore offers the advantage that the railway automation network 100 is able to be expanded in almost any given way to further applications and/or further message brokers, so that corresponding changes are able to be realized flexibly.

Figure 2:
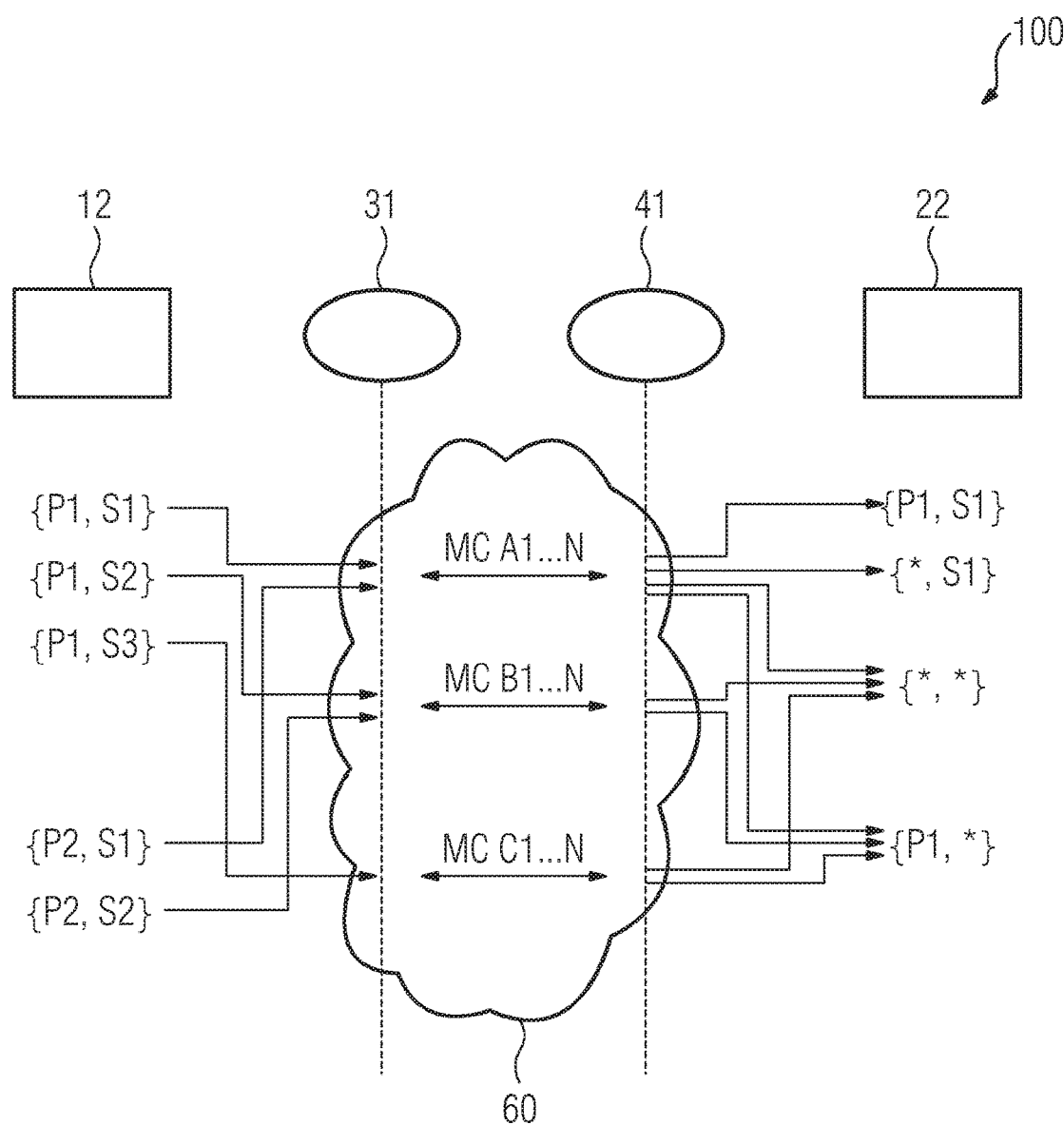
FIG. 2 shows a schematic diagram of a second exemplary embodiment of the inventive railway automation network.

FIG. 2 shows a schematic diagram of a second exemplary embodiment of the inventive railway automation network. In this embodiment the way in which the network is depicted in FIG. 2 differs from that shown in FIG. 1. Shown here on the left-hand side of FIG. 2 is a transmitter-end application 12 or a number of transmitter-end applications 12. This or these is or are connected to a transmitter-end message broker 31, which in its turn is connected for communication purposes via a communication network 60 with redundant network paths to a receiver-end message broker 41. Linked in its turn to the receiver-end message broker 41 of the railway automation network 100 is or are a receiver-end application 22 or a number of corresponding receiver-end applications 22.

On the part of the transmitter-end application 12 different messages are now identified by curly brackets in the diagram depicted in FIG. 2. In this figure P1 or P2 designates the respective publisher, i.e. the respective transmitter-end application 12. The respective subject or theme of the message concerned is designated S1, S2 or S3.

Within the framework of the exemplary embodiment described it should be assumed that the railway automation network 100 is configured to transfer the respective messages simultaneously to a number of receiver-end message brokers 41, which are each assigned to at least two multicast groups, wherein each of the multicast groups uses one of the redundant, at least partly physically independent network paths of the railway automation network 100. The respective multicast groups are indicated in FIG. 2 by the designation MC A1..N, MC B1..N and MC C1..N. In this case for example MC A1 means that this involves the multicast group relating to subject S1 over the first of the redundant network paths. In the case of two corresponding redundant network paths N would thus be 2, i.e. MC A2 would in this case designate the multicast group relating to subject S1 in relation to the second network path. In a similar way corresponding multicast groups MC B1, MC B2, MC C1, MC C2 are also provided in relation to subjects S2 and S3. By means of the corresponding multicast groups MC A1, MC A2, MC B1, MC B2, MC C1, MC C2 here, even in the event of a number of receiver-end message brokers, a simultaneous and efficient transfer of the respective message over the redundant, at least partly physically independent network paths of the communication network 60 of the railway automation network 100 is guaranteed or realized. In this case each of the multicast groups is assigned a corresponding multicast address. Messages that are published by different transmitter-end applications 12 or publishers on the same subject are preferably sent with the same multicast, i.e. using the same multicast groups. This means that—as already mentioned—the multicast groups MC A1, MC A2, MC B1, MC B2, MC C1, MC C2 are each assigned to the subject of the messages.

The receiver-end message broker 41 filters incoming messages in accordance with its available subscriptions or registrations of the receiver-end application(s) 22 or P1/P2. Within the framework of the exemplary embodiment described, the respective subject as well as an identity identifying the transmitter-end application in each case are available here as selection criteria. By means of these selection criteria or filter criteria the receiver-end applications 22 can thus choose the messages that they would like to receive. Thus it is conceivable for example for a receiver-end application (i.e. a subscription) to wish to receive all messages from one or more transmitter-end application(s). On the other hand there might be another transmitter-end application that wished to receive (only) all messages on a specific subject. Provided that moreover—unlike in the diagram depicted in FIG. 2—a message type is available as a selection criterion, a choice could be made by means of the message type that for example all log messages, all credible messages, i.e. safe messages in signaling terms, all messages not safe in signaling terms and/or all control messages will be subscribed to and consequently received. Advantageously there is the option here of using wild card values for the selection, so that for example messages on a particular subject from any given transmitter-end applications are subscribed to and as a consequence can be received.

As a consequence of the subscription model described above that also just some of the messages of a transmitter-end application can be subscribed to, the messages are preferably provided by the respective transmitter-end application with sequence numbers, which are specific to the respective receiver-end application and the specific subject (as well as also the respective message type where necessary). Through this it is preferably possible for the respective receiver-end application to recognize a loss of a message on the basis of the sequence numbers contained in the received messages.

In the exemplary embodiment depicted in FIG. 2 the transmitter-end application 12 or more precisely the transmitter-end application P1 publishes, from top to bottom, messages on the subjects S1, S2 and S3. In a corresponding way, the transmitter-end application P2 publishes messages on the subject S1 and S2. The corresponding messages are transmitted in the way previously described via the communication network 60 to the receiver-end message broker 41 or to a plurality of corresponding receiver-end message brokers. The receiver-end message broker 41 distributes incoming messages to all receiver-end applications 22 or subscribers that are registered with it.

Shown on the right-hand side of FIG. 2, under the block 22 designating the receiver-end application 22 or in general the receiver side, at the topmost location—likewise in curly brackets—is a pattern {P1,S1} specified by the receiver-end application concerned during the respective registration or during the respective subscribe process. This means that the receiver-end application involved would like to receive all messages from the transmitter-end application P1 on the subject S1. Accordingly the receiver-end message broker 41 forwards all corresponding messages to the receiver-end application concerned.

Below this, i.e. in the second row, the case is shown in which a receiver-end application has registered by means of a wildcard by means of the pattern or filter {*,S1} for messages on the subject S1 from any given transmitter-end applications. Accordingly the receiver-end message broker 41 forwards all messages on the subject S1 to the receiver-end application concerned. It should be pointed out that, preferably also in other searches, in relation to optional parameters such as a message type or location information, wildcards are supported in such a way that a missing field or a field set to zero is interpreted as suitable.

In the third row on the receive side the case is shown in which a receiver-end application, by means of the pattern {*,*} has used a wildcard both in relation to the respective transmitter-end application and also in relation to the respective subject when subscribing or when registering. The result of this is that all messages will be forwarded to the receiver-end application involved on the part of the receiver-end message broker 41. In practice an exceptional case will regularly be involved here. This can occur for example when the receiver-end application or component concerned involves one that is specifically intended to record or if necessary diagnose the entire message traffic transmitted within the railway automation network 100.

In the last row on the receive side the case is shown in which a receiver-end application, by means of the pattern {P1, *} used when subscribing, wishes to receive all messages, i.e. without any restrictions with regard to subject, from the transmitter-end application P1. Accordingly the receiver-end message broker in this case forwards all messages of the transmitter-end application P1 to the corresponding receiver-end application.

In accordance with the explanations given above in connection with FIG. 2, there can be a flexible transfer of messages between transmitter-end and receiver-end applications by means of the publish/subscribe system. For this it is advantageously not necessary for the applications to know about one another or to communicate directly with one another.

Figure 3:
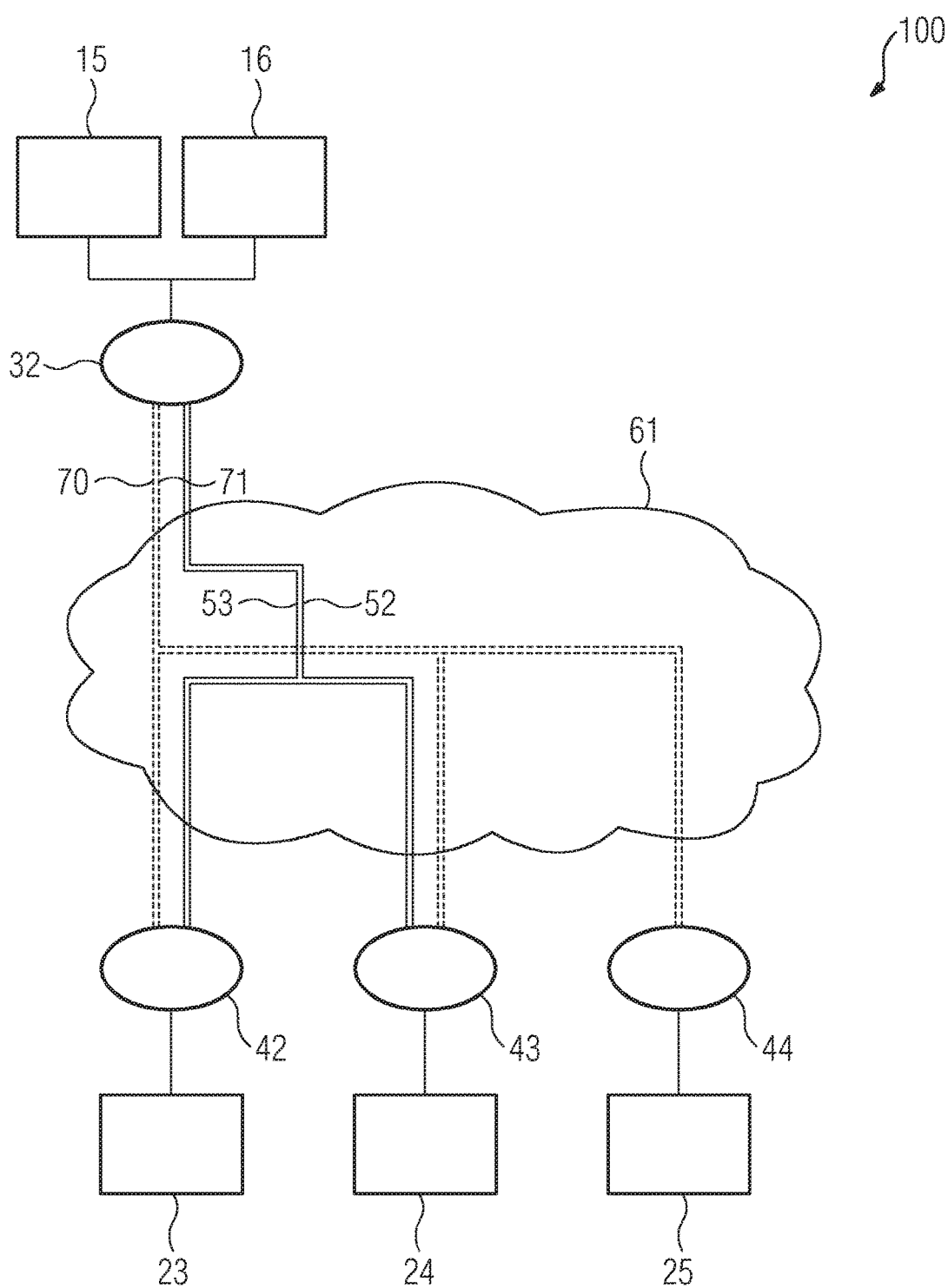
FIG. 3 shows a schematic diagram of a third exemplary embodiment of the inventive railway automation network.

FIG. 3 shows a schematic diagram of a third exemplary embodiment of the inventive railway automation network. In this figure a different way of depicting the railway automation network 100 is chosen once again by comparison with FIGS. 1 and 2. Shown here are transmitter-end applications 15, 16, which are linked for the purposes of communication to a transmitter-end message broker 32. Moreover receiver-end applications 23, 24, 25 can be seen, which are each linked for the purposes of communication to a receiver-end message broker 42, 43 or 44. Once again a communication network 61 is shown by the reference character 61, which provides redundant network paths 52, 53. For reasons of clarity the redundant network paths 52, 53 are merely shown here by the corresponding double line, without showing the at least partly physical independence of the network paths 52, 53 in any greater detail.

Within the framework of the exemplary embodiment described it is assumed that the transmitter-end applications 15, 16 involve applications that are publishing the same messages, i.e. messages with identical subjects and contents. This means that a redundancy is provided at the application level by the transmitter-end applications 15, 16.

On the part of the receiver-end applications 23, 24, 25 it is assumed that the receiver-end applications 23 and 24 have subscribed to messages published by the transmitter-end applications 15, 16. Accordingly the receiver-end message brokers 42 and 43, to which the receiver-end applications 23 and 24 are linked, and also the transmitter-end message broker 32 are together assigned to a multicast group. Through this it is advantageously made possible to transfer messages on the relevant subject simultaneously to both receiver-end message brokers 42 and 43. For the purposes of redundant transfer over at least partly physically independent network paths, two multicast groups are provided here, wherein each of the two multicast groups uses one of the redundant network paths of the railway automation network 100.

Since the receiver-end application 25 has not subscribed to any messages of transmitter-end applications 15, 16 or to the subject published by said applications, the receiver-end message broker 44 is also not a component or member of the respective multicast groups and thus receives no messages on the subject concerned.

In accordance with the diagram depicted in FIG. 3 the message brokers 32, 42, 43 and 44 are moreover connected to one another or interconnected for communication purposes via redundant network paths 70, 71 for the exchange of administration data. Pre-configured multicast groups are used for these purposes, which each in their turn use at least partly physically independent network paths of the railway automation network 100 simultaneously for these purposes. The message brokers 32, 42, 43 and 44 exchange administration data or signaling messages between themselves via the redundant network paths 70, 71 or using the pre-configured multicast groups. By means of corresponding multicasts here discovery or status messages can be transmitted between the message brokers 32, 42, 43 and 44. It should be noted in this case that preferably no central unit exists that controls the network of the message brokers 32, 42, 43 and 44. This means that the forwarding of messages of the applications 15, 16 and also the resolving of cases of errors is carried out locally by the message brokers 32, 42, 43 and 44 themselves. The applications 15, 16, 23, 24, 25 are decoupled from this. Preferably a message broker furthermore involves a process that runs autonomously and not a software library.

If for example the receiver-end application 25 registered with the receiver-end message broker 44 now sends a subscribe message to the receiver-end message broker 44, for example about the subject for which the transmitter-end applications 15, 16 are publishing messages, then the receiver-end message broker 44 establishes the multicast group by which the corresponding messages can be received. This can be done at the other message brokers 32, 42, 43 of the railway automation network 100 either via a corresponding pre-configuration, via a central database or via a corresponding request as to whether they have suitable publishers or transmitter-end applications 15, 16 and how the multicast address is used by the respective multicast group. The discovery channel in the form of the redundant network paths 70, 71 is used for the appropriate communication for the exchange of administration data. With a successful discovery of corresponding multicast groups the receiver-end message broker 44 subscribes to or joins these groups. Subsequently the receiver-end message broker 44 forwards all messages received via the multicast group(s) concerned to the receiver-end application 25.

The communication between the transmitter-end and application-end applications 15, 16, 23, 24, 25 and the respective transmitter-end or receiver-end message brokers 32, 42, 43, 44 can be message-based or via widely-used methods such as TCP (Transmission Control Protocol). In such cases the respective application 15, 16, 23, 24, 25 is advantageously completely decoupled from the transfer in the communication network of the railway automation network 100. At the same time the message addressing can be implemented by means of the message brokers 32, 42, 43, 44 advantageously completely differently and transparently for the respective application 15, 16, 23, 24, 25. This means that a break or a decoupling is created by the message brokers 32, 42, 43, 44 in communication behavior between the respective communication network and the applications 15, 16, 23, 24, 25 on the one hand and the message brokers 32, 42, 43, 44 between themselves on the other hand. In other words the message brokers 32, 42, 43, 44 implement a network-independent access layer, which abstracts from Internet technology. The applications 15, 16, 23, 24, 25 use a separate addressing scheme, which represents a publish/subscribe pattern. This is preferably not based on Internet addresses. The mapping of the publish/subscribe behavior to Internet protocols is preferably done advantageously by the message brokers 32, 42, 43, 44.

Figure 4:
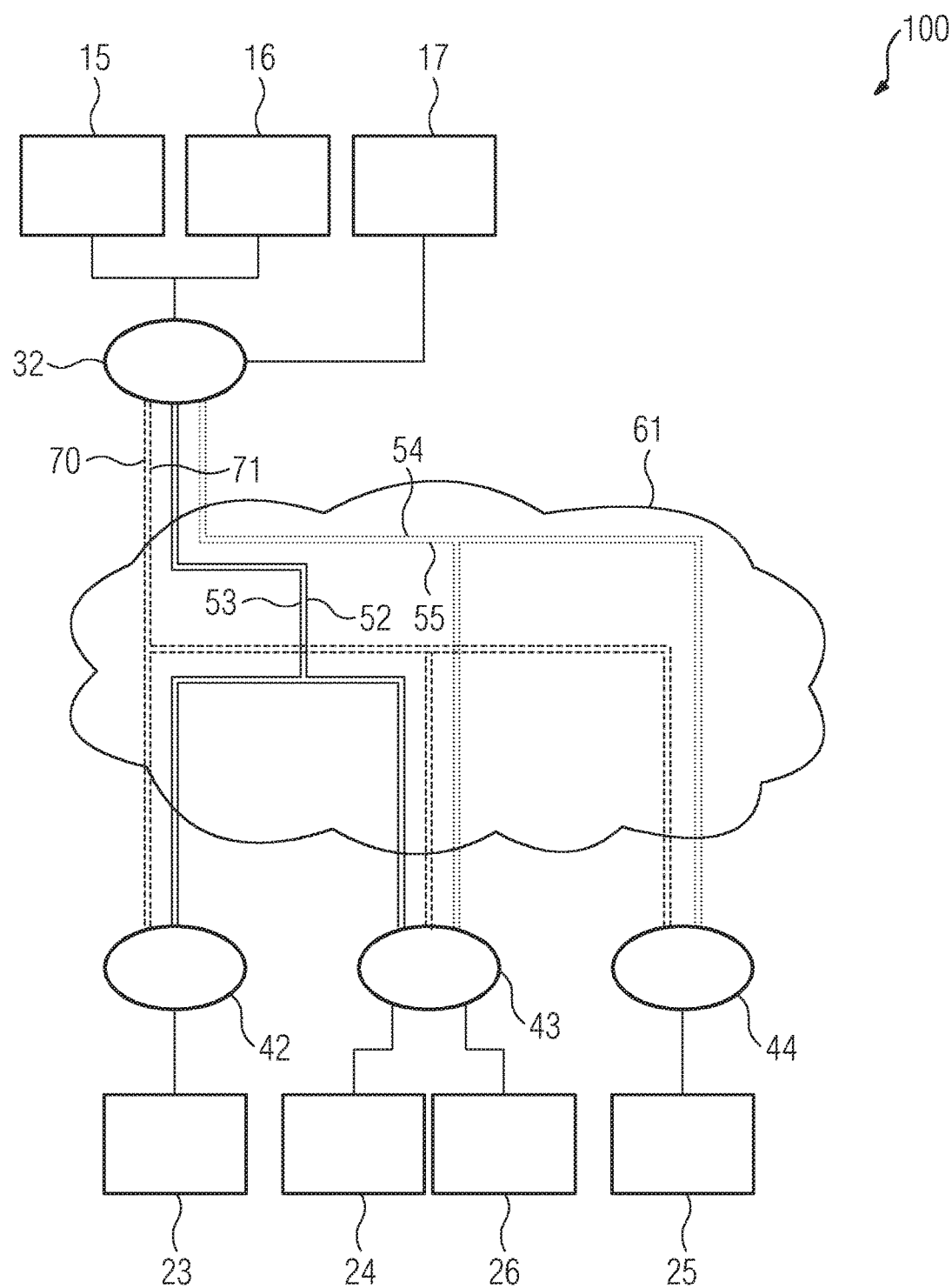
FIG. 4 shows a schematic diagram of a fourth exemplary embodiment of the inventive railway automation network.

FIG. 4 shows a schematic diagram of a fourth exemplary embodiment of the inventive railway automation network. In this case, by comparison with FIG. 3, FIG. 4 shows a railway automation network 100 expanded by further components. Thus on the one hand a further transmitter-end application 17 is shown, which is publishing messages about another or a further subject (e.g. about a uniform time of the railway automation network 100). Moreover a further receiver-end application 26 is linked to the receiver-end message broker 43 for communication purposes, which like the receiver-end application 25, has subscribed to messages on the further subject about which the transmitter-end application 17 is publishing messages. The fact that a further subject is now being considered means that, unlike in FIG. 3, there are now two message flows. In this case each message flow for each of the redundant network paths 52, 53, 54, 55 corresponds to a multicast group or to a corresponding multicast address in each case. In a corresponding way any given number of further multicast groups (for corresponding further subjects) could now be added or considered.

At this point it should be pointed out for the avoidance of doubt that, instead of or as well as use of multicast, a transfer of messages within the framework of the inventive railway automation network 100 is naturally basically also possible by means of unicast. In this case the procedure that is the best in the respective individual case will be chosen as a rule. What this can look like for example is that as soon as a number of receiver-end message brokers need messages on a subject, a corresponding multicast group is set up.

Figure 5:
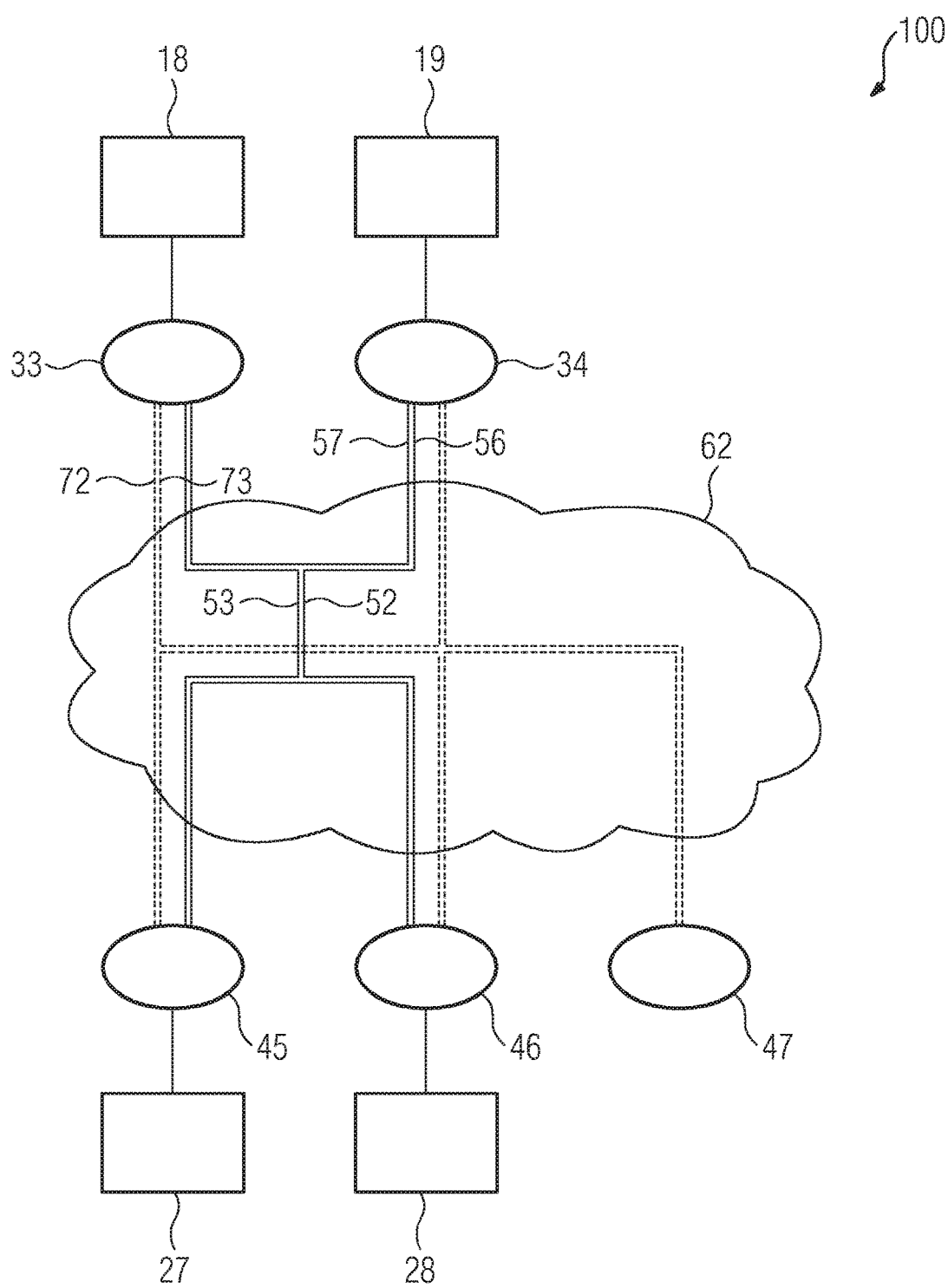
FIG. 5 shows a schematic diagram of a fifth exemplary embodiment of the inventive railway automation network.

FIG. 5 shows a schematic diagram of a fifth exemplary embodiment of the inventive railway automation network. Unlike the exemplary embodiments of FIGS. 3 and 4, in the exemplary embodiment depicted in FIG. 5 two transmitter-end applications 18, 19 are connected to different transmitter-end message brokers 33, 34 in the network. In this case the transmitter-end application 18 and the transmitter-end message broker 33 can be arranged at one location for example and the transmitter-end application 19 and the transmitter-end message broker 34 at another location for example.

Shown in the exemplary embodiment depicted in FIG. 5 are two receiver-end applications 27 and 28, which have both subscribed to the subject of the transmitter-end applications 18 and 19, i.e. receive all corresponding messages on this subject. In this case the receiver-end application 27 is linked to a receiver-end message broker 45 and the receiver-end application 28 is linked to a receiver-end message broker 46 for communication purposes.

Moreover a receiver-end message broker 47 can be seen to which no receiver-end application is linked for communication purposes. Despite this the receiver-end message broker 47 is also connected by means of redundant communication connection 72, 73 for exchange of administration data to the other message brokers 33, 34, 45 and 46 of the railway automation network 100.

Moreover it can be seen from FIG. 5 that, in accordance with the diagram in FIGS. 3 and 4, the transmitter-end message brokers 33 and 34 as well as the receiver-end message brokers 45 and 46 are each assigned to two multicast groups, wherein each of the multicast groups in its turn uses a redundant at least partly physically independent network path 56, 57 of the railway automation network 100.

Regardless of the relevant exemplary embodiments of the railway automation network described previously, the respective receiver-end message broker is preferably configured, because of the redundant transfer of the messages or because of redundant transmitter-end applications, to discard duplicates of the message received. Within the railway automation network 100 a highly scaling and real-time-capable connectionless protocol, in particular the User Datagram Protocol (UDP), is used as the transport protocol for transferring the respective messages.

Through the multiple time-offset transfer of messages over each of the at least partly physically independent network paths the robustness in respect of temporary faults of the communication network or the communication networks used by the railway automation network can advantageously be further enhanced. Thus the possibility exists of realizing a line redundancy as well as a network redundancy. Moreover, depending on the respective requirements and circumstances, redundancy can also advantageously be realized at the application level without any additional effort and without local restrictions, i.e. while including any given locations, and without the need for any communications switchover. It is to be taken into consideration here that the conveyance by means of the message brokers enables hardware-independent applications advantageously to be independent of location to the extent that transmitter-end and receiver-end applications, i.e. transmitters and receivers of a respective message, are preferably decoupled from one another in such a way that the location of the individual participants is entirely random and can thus also be dynamically changed. In this case changes in the communication network advantageously do not affect the communication of the applications within the applications themselves, since the applications preferably have their own addressing space independent of the network. For this it is merely necessary for the applications to be uniquely named or identified in each case.

The functional safety needed in railway automation can be established by the structure of the messages from application to application, in which case no safety relevance is given to the message brokers. To this end the messages conveyed from the receiver-end application for example can contain checkable information about the credibility and the originator of the respective message. As a result the messages can thus—as described above with reference to the exemplary embodiments—be conveyed by the message brokers without a protected and monitored peer-to-peer relationship being necessary between the respective transmitter-end application and the respective receiver-end application.

Through the respective message brokers a transmitter-end application can publish a message and in doing so makes no assumption about the respective recipients, i.e. receiver-end applications. These can subscribe to the messages relevant for them or required by them through filter rules at the respective receiver-end message broker. For the railway automation with its high requirements as regards safety or signaling system safety, the particular advantage is produced here that a corresponding certification must extend exclusively to the applications, but not to the message brokers however. In this case the railway automation network or system described with reference to the exemplary embodiments above advantageously allows use of a plurality of message brokers. Thus for example a message broker can be provided for each computer connected to the railway automation network, whereby the availability of the overall system is increased if a message broker fails. This is of particular importance since the availability of communication is primarily determined by the message brokers or by the broker network that said brokers form. The fact that the functional safety in the applications can be separated entirely from the message brokers or from the availability of communication advantageously enables probabilistic advantages to be produced for the overall system, i.e. the railway automation network as a whole.

In accordance with what has been said in connection with the exemplary embodiments described above, the inventive railway automation network and the inventive method for transfer of messages in such a railway automation network thus have significant advantages particularly in relation to the flexibility and scalability made possible. In this instance the specific requirements of railway automation are in particular taken into account by messages being transmitted simultaneously over at least two redundant, at least partly physically independent network paths.

The invention claimed is:

1. A railway automation network, comprising:
a publish/subscribe system including:
at least one transmitter-end application configured for publication of messages,
at least one transmitter-end message broker,
at least one receiver-end message broker, and
at least one receiver-end application configured for receipt of messages;
at least two redundant, at least partly physically independent network paths of the railway automation network;
each said at least one transmitter-end application being linked for communication to said at least one transmitter-end message broker;
each said at least one transmitter-end message broker being configured to respectively map a message published by said at least one transmitter-end application based on a subject specified in said message onto each of said at least two network paths;
said at least two network paths configured to transfer said message and at least one physically independent copy of said message respectively and simultaneously over said at least two network paths to said at least one receiver-end message broker;
each said at least one receiver-end application being linked for communication to said at least one receiver-end message broker;
said at least one receiver-end message broker being configured to transfer said message and said at least one copy of said message to said at least one receiver-end application;
a plurality of said receiver-end message brokers simultaneously receiving said message and said at least one copy of said message, said plurality of receiver-end message brokers each being assigned to at least two multicast groups, and each of said multicast groups using one of said network paths; and
all of said message brokers being connected for communication with one another by using pre-configured multicast groups for exchanging administration data.

2. The railway automation network according to claim 1, wherein said at least one receiver-end message broker is configured to discard duplicates of said message received because of a redundant transfer of said message.

3. The railway automation network according to claim 1, which further comprises a connectionless protocol or User Datagram Protocol being used as a transport protocol for transfer of said message.

4. The railway automation network according to claim 1, wherein said at least one transmitter-end application is configured to publish a message including selection criteria formed as a subject and a code identifying said at least one transmitter-end application as a respective identity unique within the railway automation network.

5. The railway automation network according to claim 1, wherein said at least one transmitter-end application is configured to publish a message including a domain identification through which a plurality of said transmitter-end applications are identified as belonging together.

6. The railway automation network according to claim 1, wherein said transmitter-end message broker is configured to transfer said message multiply offset in time over each of said network paths to said at least one receiver-end message broker.

7. The railway automation network according to claim 1, wherein at least one of said applications is provided redundantly.

8. A method for transferring messages in a railway automation network, the method comprising the following steps:
providing a publish/subscribe system including:
at least one transmitter-end application configured for publication of messages, at least one transmitter-end message broker linked for communication to each at least one transmitter-end application, at least one receiver-end application configured for receipt of messages, and at least one receiver-end message broker linked for communication to each at least one receiver-end application;

using each of the at least one transmitter-end message broker to respectively map a message published by the at least one transmitter-end application, based on a subject specified in the message, onto each of at least two redundant, at least partly physically independent network paths of the railway automation network;

simultaneously transferring the message and at least one physically independent copy of the message respectively over the at least two network paths to the at least one receiver-end message broker; and transferring the message and the at least one copy of the message from the at least one receiver-end message broker to the at least one receiver-end application;

simultaneously transferring the message and the at least one copy of the message to a plurality of receiver-end message brokers each being assigned to at least two multicast groups, and using one of the network paths for each of the multicast groups; and connecting all of the message brokers for communication with one another by using pre-configured multicast groups for exchanging administration data.

9. The method according to claim 8, which further comprises using the at least one receiver-end message broker to discard duplicates of the message received because of the redundant transfer of the message.

10. The method according to claim 8, which further comprises using pre-configured multicast groups to exchange administration data between the message brokers.

11. The method according to claim 8, which further comprises using a connectionless protocol or User Datagram Protocol as a transport protocol for transferring the message.

12. The method according to claim 8, which further comprises using the at least one transmitter-end application to publish the message including selection criteria formed of a subject and a code identifying the at least one transmitter-end application as a respective identity unique within the railway automation network.

13. The method according to claim 8, which further comprises using the at least one transmitter-end application to publish the message including a domain identification through which a plurality of transmitter-end applications are identified as belonging together.

14. The method according to claim 8, which further comprises using the at least one transmitter-end message broker to transfer the message multiply offset in time to the at least one receiver-end message broker over each of the network paths.

* * * * *

UNITED STATES PATENT AND TRADEMARK OFFICE
CERTIFICATE OF CORRECTION

PATENT NO. : 12,030,535 B2
APPLICATION NO. : 16/756549
DATED : July 9, 2024
INVENTOR(S) : Uwe Eckelmann-Wendt et al.

It is certified that error appears in the above-identified patent and that said Letters Patent is hereby corrected as shown below:

In the Claims

Columns 18-19, Claim 8 should read as follows:
8. A method for transferring messages in a railway automation network, the method comprising the following steps:
    providing a publish/subscribe system including:
        at least one transmitter-end application configured for publication of messages,
        at least one transmitter-end message broker linked for communication to each at least one transmitter-end application,
        at least one receiver-end application configured for receipt of messages, and
        at least one receiver-end message broker linked for communication to each at least one receiver-end application;
using each of the at least one transmitter-end message broker to respectively map a message published by the at least one transmitter-end application, based on a subject specified in the message, onto each of at least two redundant, at least partly physically independent network paths of the railway automation network;
simultaneously transferring the message and at least one physically independent copy of the message respectively over the at least two network paths to the at least one receiver-end message broker;
transferring the message and the at least one copy of the message from the at least one receiver-end message broker to the at least one receiver-end application;

Signed and Sealed this
Twentieth Day of August, 2024

*Katherine Kelly Vidal*
*Director of the United States Patent and Trademark Office* simultaneously transferring the message and the at least one copy of the message to a plurality of receiver-end message brokers each being assigned to at least two multicast groups, and using one of the network paths for each of the multicast groups; and connecting all of the message brokers for communication with one another by using pre-configured multicast groups for exchanging administration data.